(12) United States Patent
Ochiai et al.

(10) Patent No.: US 6,752,114 B2
(45) Date of Patent: Jun. 22, 2004

(54) FOUR-CYCLE ENGINE FOR OUTBOARD MOTOR

(75) Inventors: Katsumi Ochiai, Shizuoka (JP); Goichi Katayama, Shizuoka (JP); Masanori Takahashi, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/280,432

(22) Filed: Oct. 24, 2002

(65) Prior Publication Data

US 2003/0089327 A1 May 15, 2003

(30) Foreign Application Priority Data

Oct. 25, 2001 (JP) ........................................ 2001-327636

(51) Int. Cl.[7] .............................................. F02M 35/10
(52) U.S. Cl. ................................. 123/184.21; 123/456
(58) Field of Search ...................... 123/184.21, 184.34, 123/184.35, 193.5, 470, 456; 440/88, 89, 900, 77, 78

(56) References Cited

U.S. PATENT DOCUMENTS

| | | | |
|---|---|---|---|
| 5,329,905 A | * | 7/1994 | Kawaguchi et al. ........ 123/472 |
| 5,983,843 A | * | 11/1999 | Suzuki et al. ......... 123/41.82 R |
| 6,053,145 A | | 4/2000 | Suzuki et al. |
| 6,062,195 A | | 5/2000 | Tanaka et al. |
| 6,189,503 B1 | | 2/2001 | Takano |
| 6,205,974 B1 | | 3/2001 | Yonezawa et al. |
| 6,213,825 B1 | | 4/2001 | Ozawa |
| 6,220,217 B1 | | 4/2001 | Kato |
| 6,223,715 B1 | | 5/2001 | Suzuki |
| 6,286,472 B1 | | 9/2001 | Takahashi et al. |
| 6,302,086 B1 | | 10/2001 | Kato |
| 6,302,088 B1 | | 10/2001 | Kato |
| 6,357,402 B1 | | 3/2002 | Kato |
| 6,408,835 B1 | | 6/2002 | Katayama et al. |
| 6,415,773 B1 | | 7/2002 | Katayama et al. |
| 6,450,847 B1 | * | 9/2002 | Kashima et al. .......... 440/88 R |
| 2001/0047776 A1 | | 12/2001 | Takahashi et al. |
| 2002/0073971 A1 | | 6/2002 | Katamaya |

OTHER PUBLICATIONS

Patent application –Ser. # 10/226,786; filed Aug. 21, 2002; Inventor G. Katayama.

* cited by examiner

Primary Examiner—Tony M. Argenbright
Assistant Examiner—Hyder Ali
(74) Attorney, Agent, or Firm—Knobbe, Martens, Olson & Bear, LLP

(57) ABSTRACT

A direct fuel injector is positioned to provide better fuel atomization within the combustion chamber. The direct fuel injector is disposed between an intake manifold and a cylinder head assembly thereby eliminating the need for additional fuel delivery conduits, thus decreasing the size of the engine and lowering the production costs of the outboard motor. The direct fuel injector position permits immediate air/fuel mixture adjustments allowing improved acceleration enrichment and lean stratified charge operation. The direct fuel injector position and routing of induction system components allows for compact placement of auxiliary components. The integrated direct fuel injector position enables the operator to enjoy compact engine design, improved engine performance and increased fuel efficiency.

27 Claims, 6 Drawing Sheets

FOUR-CYCLE ENGINE FOR OUTBOARD MOTOR

PRIORITY INFORMATION

This application is based on and claims priority to Japanese Patent Application No. 2001-327636, filed Oct. 25, 2001, the entire contents of which is hereby expressly incorporated by reference.

BACKGROUND OF THE INVENTION

1. Field of the Invention

The present invention relates generally to an engine fuel delivery system for an engine, and more particularly to an improved fuel injector and cylinder head assembly allowing for a more compact engine design and stratified-charge operation.

2. Brief Description of Related Art

One important characteristic of an engine is its output power. A great deal of engineering is involved with improving the output power of an engine. In addition, an equal amount of care is often involved with maintaining the output power when developing and installing additional engine systems and components.

One particularly sensitive system is the air induction system. Typically, induction systems for engines designed for outboard motor use include a plenum chamber, a throttle body, and an intake passage. In addition, typical engines include a fuel delivery system which cooperates with the air induction system to deliver an air/fuel charge to a combustion chamber of the engine. The fuel delivery system typically comprises a fuel tank, one or more fuel conduits, and a fuel injector for those engines using a direct injection method of delivering fuel to a combustion chamber. The fuel delivery system commonly includes fuel injectors mounted in close proximity to an engine body to inject fuel directly into a cylinder head or into an intake passage that communicates with the combustion chamber.

These two cooperating systems must be configured to deliver air and fuel to the combustion chamber. However, these systems must be carefully engineered so as to reduce the flow resistance in each of these systems, which can have an adverse effect on the engine efficiency, and hence, the output power.

Perhaps the greater importance is the configuration of the air induction system and, particularly, the routing of the air intake pipes, intake manifold, and intake runners. It is preferable that the air intake pipes have a low flow resistance, and hence it becomes undesirable for the intake pipes to be bent or tapered to avoid interference with other engine accessories, which can increase the intake resistance, and therefore, result in the reduction of engine output power.

Many of the engine accessories can be beneficially located to provide for a smoother operating and more efficient engine. Unfortunately, the desired location of these accessories can interfere with the preferred routing of the induction system components. While the engine accessories can be mounted in various locations around the engine, their location must be balanced against the desire to maintain a compact engine.

Due to compact engine design demands, fuel injectors are often placed close to the outside of the engine body. However, heat transfer issues can arise when the fuel injectors are placed in proximity to the engine body, and heat generated within the engine body from the combustion process flows to the fuel injectors and heats the fuel before it is injected into the combustion chamber, which can reduce the engine efficiency.

SUMMARY OF THE INVENTION

One aspect of the present invention includes the realization that the induction system components can be beneficially configured and routed to provide a low flow resistance while allowing for a sufficient space to mount auxiliary components in close proximity to the engine body thus providing a compact engine arrangement. An additional aspect includes the realization that the fuel injectors can be located in close proximity to the engine body and the heat transfer reduced by indirect cooling from the adjacent air induction system components.

In accordance with another aspect of the invention, a four-cycle engine for use in an outboard motor comprises a cylinder body defining at least one cylinder bore therethrough, a cylinder head assembly connected to the cylinder body, and a piston disposed within the cylinder bore. The cylinder body, the cylinder head assembly, and the piston cooperate to define a combustion chamber.

At least one intake passage is formed in the cylinder head assembly. A crankshaft is rotatably coupled to the piston. Additionally, a fuel injector has a longitudinal axis and is arranged to directly inject fuel into the combustion chamber. The fuel injector is additionally disposed between the intake passage and an imaginary line extending laterally from a junction between the cylinder body and the cylinder head assembly when viewed from a direction along an axis of the crankshaft. In this orientation, the fuel injector axis is arranged to be substantially parallel to the intake passage defined by the cylinder head assembly.

An induction system is connected to the intake passage and extends generally laterally from the cylinder head assembly and then along a side of the cylinder body at a distance from the cylinder body. An auxiliary component is disposed in a space formed between the induction system and the cylinder body.

The cylinder head assembly can include at least two intake passages that are disposed next to each other in a direction that extends generally parallel to the axis of the crankshaft, and the fuel injector can be disposed in a vicinity between the two intake passages.

The auxiliary component disposed in the space formed between the cylinder body and the induction system can be a fuel vapor separator, a throttle link mechanism, a battery, a starter motor, an oil filter, or a fuel cooler or any combination thereof, including additional auxiliary components not specifically listed.

According to one embodiment in which the cylinder body defines a plurality of cylinder bores arranged in a V-shape, the induction system is disposed on the exterior of the V-shape.

According to another aspect, a four-cycle engine comprises an engine block defining a cylinder bore and has a cylinder head assembly attached to the cylinder block to close one end of the cylinder bore. The cylinder head assembly includes at least one intake passage. A piston is positioned within the cylinder bore and is arranged to reciprocate along a cylinder axis so as to define a variable volume combustion chamber together with the cylinder bore and the cylinder head. The intake passage of the cylinder head communicates with the combustion chamber through at least one intake port. A fuel injector is configured to inject fuel directly into the combustion chamber and is disposed between the engine body and the intake passage. The fuel injector preferably has a longitudinal axis that is oblique to the cylinder axis.

The fuel injector can be positioned between the intake passage and a plane extending laterally from a junction of the engine body and the cylinder head assembly. The fuel injector longitudinal axis can be arranged generally parallel to a flow axis of the intake passage.

According to yet another aspect, an engine having an engine body comprises at least one variable volume combustion chamber defined in part by a head of a moveable piston. At least one intake port opens into the combustion chamber. An induction system communicates with the intake port through at least intake passage formed in a cylinder head of the engine body. An intake valve is moveable to regulate communication between the induction system and the combustion chamber through the intake port and the intake passage. The fuel delivery system has at least one fuel injector arranged to lie generally parallel to the intake passage for injecting fuel into the combustion chamber. The fuel injector is preferably positioned between the engine body and the intake passage. The fuel injector can be oriented such that the fuel injector injects fuel into the combustion chamber toward the head of the piston.

The engine body can comprise a crankcase, a cylinder block, and a cylinder head assembly. In this embodiment, the induction system can extend away from the cylinder head assembly, along a side of the cylinder block, and toward the crankcase.

According to another aspect, an outboard motor comprises an engine including an engine body, the engine body cooperating with at least one reciprocating piston to define at least one combustion chamber. An induction system is configured to guide air to the combustion chamber through at least a pair of intake ports. At least one fuel injector is configured to inject fuel for combustion in the combustion chamber. The fuel injector is preferably mounted between the engine body and at least a portion of the induction system and is generally in between the pair of intake ports. The fuel injector is configured to spray fuel toward the piston.

The engine body can comprise a cylinder body connected to a cylinder head, and wherein the fuel injector is located between the induction system and a plane extending laterally from the connection between the cylinder body and the cylinder head.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise six figures in which.

DETAILED DESCRIPTION OF PREFERRED EMBODIMENTS

Figure 1:
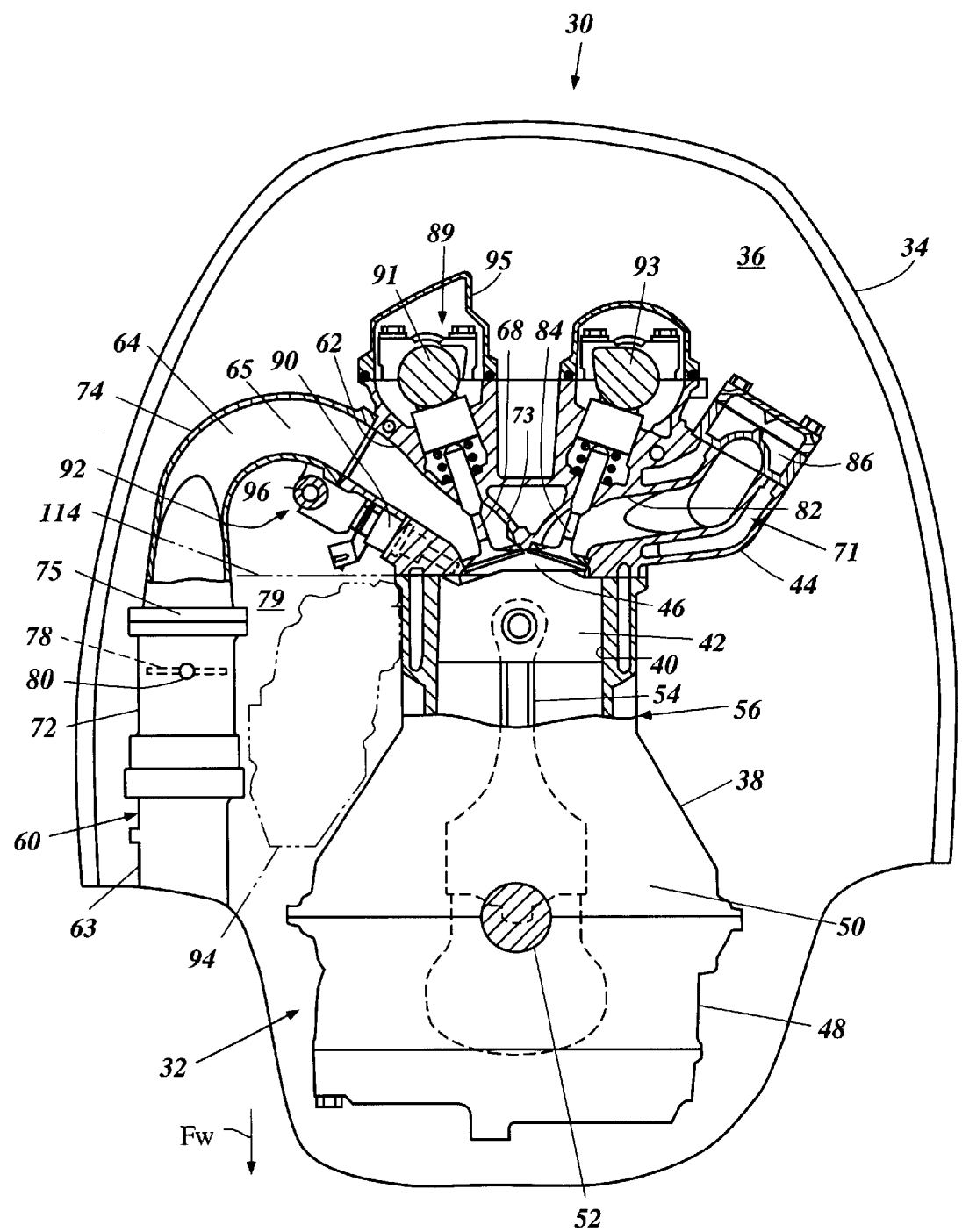
FIG. 1 is a partial top plan view of an outboard motor configured in accordance with a preferred embodiment of the present invention, with a portion of an engine of the outboard motor shown in section.
Figure 2:
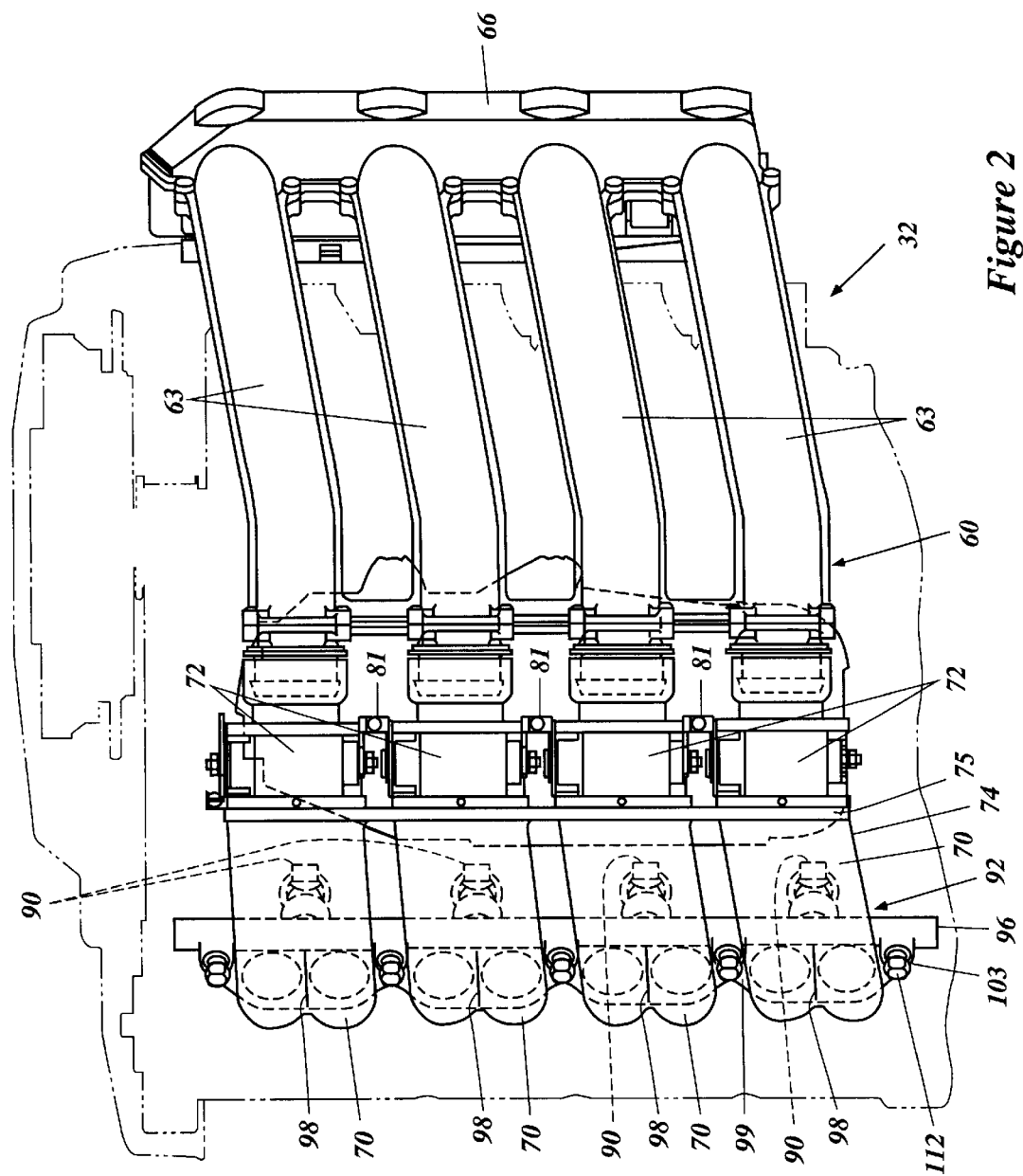
FIG. 2 is a side elevational view of the engine of FIG. 1, showing portions of the induction and fuel injection systems.

With reference to FIGS. 1 and 2, an overall construction of an outboard motor 30 that employs an internal combustion engine 32 configured in accordance with certain features, aspects and advantages of the present invention is described below. The engine 32 has particular utility in the context of a marine drive, such as the outboard motor, and thus is described in the context of an outboard motor. The engine 32, however, can be used with other types of marine drives (i.e., inboard motors, inboard/outboard motors, jet drives, etc.) and also certain land vehicles. In any of these applications, the engine 32 can be oriented vertically or horizontally. Furthermore, the engine 32 can be used as a stationary engine for some applications that will become apparent to those of ordinary skill in the art.

As used through this description, the terms "forward," "forwardly", "front", and the abbreviation "Fw" mean at or to the side where the outboard motor is attached to a boat, and the terms "rear," "reverse," "backwardly" and "rearwardly" mean at or to the opposite side of the front side, unless indicated otherwise or otherwise readily apparent from the context in which these terms are used.

The illustrated outboard motor 30 comprises a protective cowling assembly 34 containing the internal combustion engine 32. As is known in the art, the cowling assembly 34 is generally part of a power head (not shown), which is connected to a housing unit (not shown). The power head is disposed atop the housing unit and includes the internal combustion engine 32 and the protective cowling assembly 34.

Preferably, the protective cowling assembly 34, which preferably is made of a light-weight material, for example, plastic or fiberglass, defines a generally closed cavity 36 in which the engine 32 is disposed. As is known in the art, the protective cowling assembly generally comprises an upper cowling member (not shown) that is removably attached to a lower cowling member (not shown). The cowling 34 has one or more openings therein to allow the cavity 36 to communicate with the atmosphere. Accordingly, atmospheric air is drawn into the cavity 36, and eventually, into the induction system 60.

The engine 32 in the illustrated embodiment operates on a four-cycle combustion principle. The engine 32 has a cylinder block 38, which in the illustrated embodiment, defines four in-line cylinder bores 40 that extend generally horizontally and that are generally vertically spaced from one another.

This type of engine, however, merely exemplifies one type of engine on which various aspects and features of the present invention can be suitably used. Engines having other numbers of cylinders, having other cylinder arrangements (V, W, opposing, etc.), and operating on other combustion principles (e.g., crankcase compression two-stroke, diesel, or rotary) also can employ various features, aspects and advantages of the present invention. In addition, the engine can be formed with separate cylinder bodies rather than a number of cylinder bores formed in a cylinder block 38. Regardless of the particular construction, the engine preferably comprises an engine body that includes at least one cylinder bore.

A moveable member, such as a reciprocating piston 42, moves relative to the cylinder block 38 in a suitable manner. In the illustrated arrangement, the piston 42 reciprocates within each cylinder bore 40, as is well-known.

A cylinder head assembly 44 is affixed to one end of the cylinder block 38 to close one end of the cylinder bores 40. The cylinder head assembly 44, together with the associated pistons 42 and cylinder bores 40, preferably defines four combustion chambers 46. Of course, the number of combustion chambers can vary, as indicated above.

A crankcase member 48 closes the other end of the cylinder bores 40 and, together with the cylinder block 38, defines a crankcase chamber 50. A crankshaft 52 extends generally vertically through the crankcase chamber 50 and can be journaled for rotation by several bearing blocks (not shown).

Connecting rods 54 couple the crankshaft 52 with the respective pistons 42 in any suitable manner. Thus, the crankshaft 52 can rotate with the reciprocal movement of the pistons 42.

Preferably, the crankcase member 48 is located at the forward side of the engine 32, with the cylinder block 38 and the cylinder head assembly 44 being disposed rearward from the crankcase member 48. Generally, the cylinder block 38, the cylinder head assembly 44 and the crankcase member 48 together define an engine body 56.

The engine 32 also comprises an air induction system 60. The air induction system 60 guides air from within the cavity 36 to the combustion chambers 46. The air induction system 60 preferably comprises a single plenum chamber in communication with the space 36 inside the cowling 34. Preferably, the plenum chamber 66 acts as an intake silencer to attenuate noise generated by the flow of air into the respective combustion chambers 46. The plenum chamber is coupled to four throttle bodies 72 by four intake pipes 63. The throttle bodies 72 are in turn connected to an intake manifold 74 at a manifold flange 75 which provides a substantially air tight seal. The intake manifold 74 defines a plurality of intake runners 64 that are each coupled to a plurality of intake passages 62, which each communicate with a combustion chamber through associated intake ports 73.

In the illustrated embodiment, each of the intake passages 62 extends between a single inlet opening on an outer surface of the cylinder head assembly 44 and a single intake port 73 which opens to the combustion chamber 46. A single intake runner 64 is preferably bifurcated by a conduit separator 65 and thereby delivers air to a pair of intake passages 62 that deliver intake air to a single combustion chamber 46.

According to an alternative embodiment, an intake passage 62 may be bifurcated thereby allowing a single intake runner 64 to deliver air to a pair of intake ports 73. Accordingly, a single intake runner 64 communicates with a single intake passage 62 which bifurcates and delivers intake air into the combustion chamber 46 through a pair of intake ports 73.

Intake valves 68 are slidably disposed at the intake ports 73 to move between an open and a closed position. The intake valves 68 are preferable in sealing engagement with a valve seat (not shown) carried by the intake port 73 to form a substantially air-tight seal. The intake valves 68 act to open and close the intake ports 73 to control the flow of air from the intake passages 62 into the combustion chamber 46.

Each illustrated throttle body 72 has a butterfly type throttle valve 78 journaled for pivotal movement about an axis defined by a generally vertically extending valve shaft 80. Each valve shaft 80 can be coupled with the other valve shafts to allow simultaneous movement by a throttle valve coupler 81. The valve shaft 80 is operable by the operator through an appropriate conventional throttle valve linkage and a throttle lever connected to the end of the linkage. The throttle valves 78 are movable between an open position and a closed position to meter or regulate an amount of air flowing through the induction system 60. Normally, the greater the opening degree, the higher the rate of airflow and the higher the power output of the engine 32.

In order to bring the engine 32 to idle speed and to maintain this speed, the throttle valves 78 generally are substantially closed. Preferably, the valves are not fully closed which produces a more stable idle speed and inhibits sticking of the throttle valves 78 in the closed position. As used through the description, the term "idle speed" generally means a low engine speed that achieved when the throttle valves 78 are closed but also includes a state such that the valves 78 are slightly more open to allow a relatively small amount of air to flow through the intake runners 64.

The air induction system 60 preferably includes an auxiliary air device (AAD) (not shown) that bypasses the throttle valves 78 and extends from the plenum chamber 66 to the respective intake runners 64 downstream of the throttle valves 78. Idle air can be delivered to the combustion chambers 46 through the AAD when the throttle valves 78 are placed in a substantially closed or closed position.

The AAD preferably comprises an idle air passage, an idle valve and an idle valve actuator. The idle air passage is branched off to the respective intake runners 64. The idle valve controls flow through the idle air passage such that the amount of air flow can be more precisely controlled. Preferably, the idle valve is a needle valve that can move between an open position and a closed position, which closes the idle air passage. The idle valve actuator actuates the idle valve to a certain position to meter or adjust an amount of the idle air, and thus more finely adjust the idle speed of the engine.

As best shown in FIG. 1, the air induction system 60, beginning with the plenum chamber 66 extends rearwardly generally along the cowling 34 until it extends beyond an imaginary plane 114 corresponding with the junction of the cylinder block 38 and the cylinder head assembly 44. The intake passage manifold 74 then curves and extends toward the cylinder head assembly 44 and mates therewith as described in further detail below. The intake runners 64 are in communication with intake passages 62 formed within the cylinder head assembly 44. This particular routing of the induction system 60 components creates a significant auxiliary space 79 which will be discussed later in detail.

The engine 32 also comprises an exhaust system 71 that guides burnt charges, i.e., exhaust gases, to a location outside of the outboard motor 30. Each cylinder bore 40 preferably has two exhaust ports 82 defined in the cylinder head assembly 44. The exhaust ports 82 can be selectively opened and closed by exhaust valves 84. The construction of each exhaust valve 84 and the arrangement of the exhaust valves are substantially the same as the intake valves 68 and the arrangement thereof, respectively.

An exhaust manifold 86 preferably is disposed next to the exhaust ports 82 and extends generally vertically. The exhaust manifold 86 communicates with the combustion chambers 46 through the exhaust ports 82 to collect exhaust gases therefrom. When the exhaust ports 82 are opened, the combustion chambers 46 communicate with an exhaust passage (not shown) through the exhaust manifold 86 to discard the exhaust gasses.

With continued reference to FIGS. 1 and 2, the engine 32 preferably includes a direct fuel injection system. The fuel injection system preferably comprises four fuel injectors 90 with one fuel injector 90 allotted for each of the respective combustion chambers 46.

The engine 32 further comprises an ignition or firing system. Each combustion chamber 46 is provided with a spark plug (not shown) that is connected to an electronic control unit (ECU) (not shown) through an igniter so that ignition timing is also controlled by the ECU. Each spark plug has electrodes that are exposed into the associated combustion chamber and are spaced apart from each other with a small gap. The spark plugs generate a spark between the electrodes to ignite an air/fuel charge in the combustion chamber 46 at selected ignition timing under control of the ECU.

In the illustrated engine 32, the pistons 42 reciprocate between top dead center and bottom dead center positions. When the crankshaft 52 makes two rotations, the pistons 42 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 42, an actuation device 89 triggers an intake camshaft 91 to make one rotation which actuates the intake valves 68 and an exhaust camshaft 93 to make one rotation which actuates the exhaust valves 84 to open the intake passages 62 during the intake stroke and to open exhaust ports 82 during the exhaust stroke, respectively. The camshafts 91, 93 are generally protected by a cam cover 95 that is connected to the cylinder head assembly 44 in any suitable manner.

Generally, during the intake stroke, air is drawn into the combustion chambers 46 through the air intake passages 62 and fuel is injected into the combustion chambers 46 by the fuel injectors 90. The fuel can alternatively or additionally be injected by the fuel injectors 90 into the intake runners 64 or intake passages 62. The air and the fuel thus are mixed to form the air/fuel charge in the combustion chambers 46. Slightly before or during the power stroke, the respective spark plugs ignite the compressed air/fuel charge in the respective combustion chambers 46. The air/fuel charge rapidly burns during the power stroke to move the pistons 42 toward their bottom dead center positions. The burnt charge, i.e., exhaust gases, then are discharged from the combustion chambers 46 during the exhaust stroke.

During engine operation, heat builds in the engine body 56. The illustrated engine 32 thus includes a cooling system to cool the engine body 56. The outboard motor preferably employs an open-loop type water cooling system that introduces cooling water from the body of water surrounding the motor 30 and then discharges the cooling water to a surrounding body of water. The cooling system includes one or more water jackets defined within the engine body 56 through which the water travels to remove heat from the engine body 56. Further description of this system is not required to gain an understanding of the inventions described herein, and thus, will be omitted.

The engine 32 also preferably includes a lubrication system. A closed-loop type system is employed in the illustrated embodiment. The lubrication system comprises a lubricant tank defining a reservoir (not shown), and an oil pump (not shown), which is provided at a desired location, to pressurize the lubricant oil in the reservoir and to pass the lubricant oil through a suction pipe toward certain engine portions, which desirably are lubricated, through lubricant delivery passages. Such engine portions include, for example, the crankshaft bearings (not shown), the connecting rods 54 and the pistons 42. Lubricant return passages (not shown) also are provided to return the oil to the lubricant tank for re-circulation. The lubrication system may be any type that is well known in the art, and will not be discussed further.

As previously noted, the engine 32 includes a fuel delivery system 92 which preferably comprises a fuel tank (not shown), a fuel pump (not shown), a vapor separator assembly 94 (FIG. 1), a fuel rail 97, a fuel delivery pipe 96, and a fuel injector 90. The fuel tank may be placed in any desired position about the outboard motor, or remotely within the boat to which the outboard motor is attached. A fuel pump is operatively connected to the fuel tank and additionally to a vapor separator assembly 94. A fuel rail 97 is in fluid communication with the vapor separator assembly 94 and carries a fuel delivery pipe 96 which, in turn, is connected to one or more fuel injectors 90. In the illustrated embodiment, the fuel delivery pipe 96 is placed in close proximity to the intake manifold 74. In this position, the fuel delivery system can be more compact, thereby allowing for the placement of various necessary fuel delivery system components. A fuel pressure regulator (not shown), an additional fuel cooler (not shown), a fuel pressurizer (not shown) in addition to alternative components can all be mounted directly onto or in the close vicinity of the fuel delivery system 92.

Moreover, the fuel delivery pipe 96 is preferably positioned in close proximity to the intake manifold 74 and intake passages 62. Mounting the various fuel delivery system 92 components in the close vicinity of the intake manifold 74 and intake passages 62 allows for a compact design that requires less complicated production thereby providing a cost savings. A further benefit of this fuel delivery system 92 arrangement is that induction air traveling through the air induction system 60 cools the surrounding intake manifold 74, which in turn, cools the fuel flowing through the fuel delivery pipes 96. The cooled fuel, when mixed with the induction air within the combustion chamber 46, provides a cooler, more dense air/fuel mixture permitting the engine to operate more efficiently.

The fuel injector 90 is advantageously mounted in a position between the cylinder head assembly 44 and the intake manifold 74, thereby allowing for a more compact arrangement. Additionally, the fuel can be delivered directly to the fuel injector 90 from the fuel delivery pipe 96 omitting unnecessary additional fuel conduits. As illustrated, the fuel injector 90 can be positioned substantially parallel to the intake passages 62 which orients the fuel injector's longitudinal axis oblique to an axis of the cylinder. Positioning the fuel injector 90 in such a position allows for efficient use of space between the intake manifold 74 and the cylinder block 38, allowing a greater auxiliary space 79 for additional components, such as, for example, a fuel vapor separator 94, a throttle link mechanism (not shown), a battery (not shown), a starter motor (not shown), an oil filter (not shown), a fuel cooler (not shown), a pressure regulator (not shown), a fuel pressurizer (not shown) or other auxiliary components.

Figure 3:
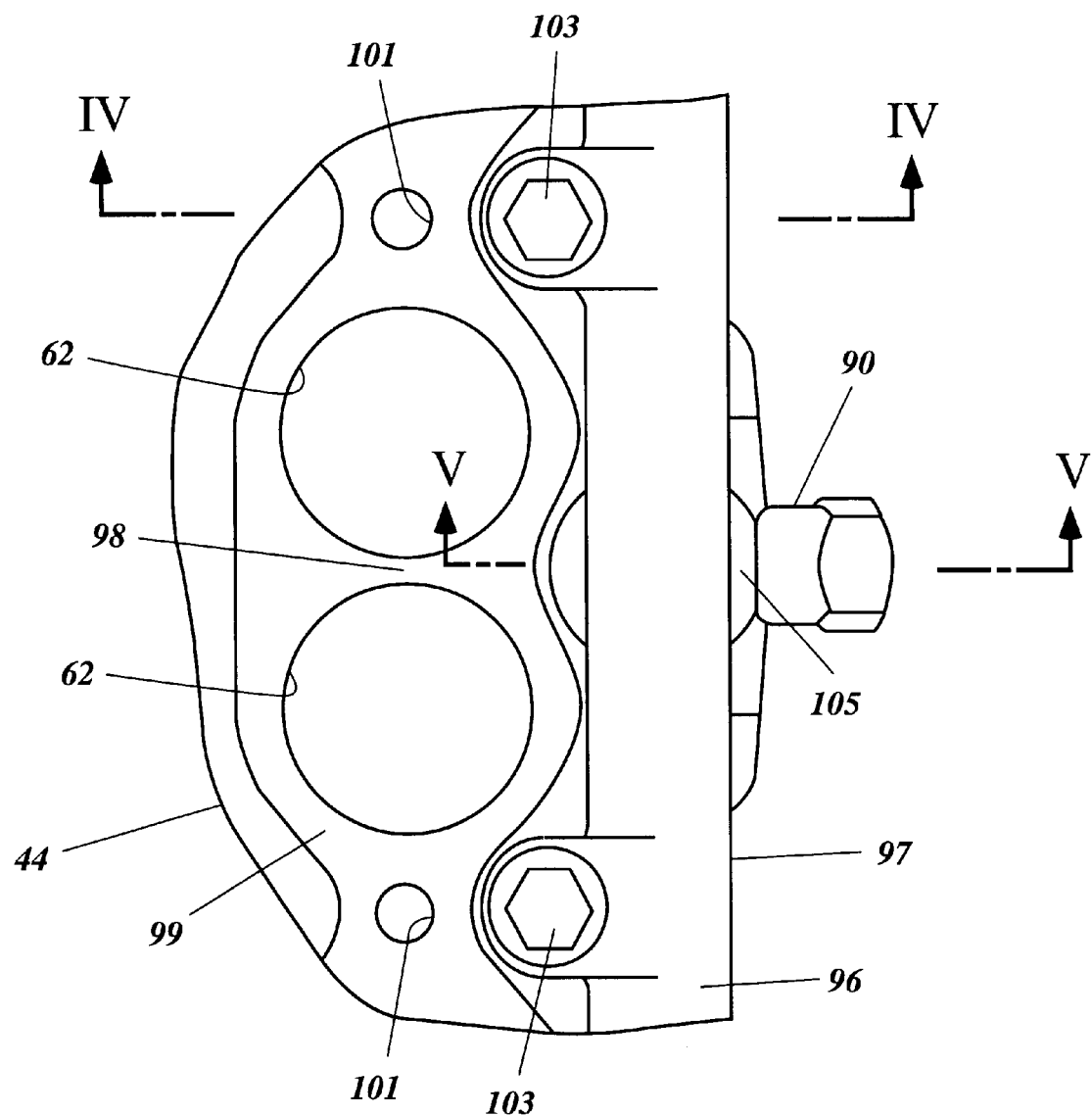
FIG. 3 is a partial cutaway view of a cylinder head of the engine illustrating the intake passageways and portions of the fuel system.
Figure 4:
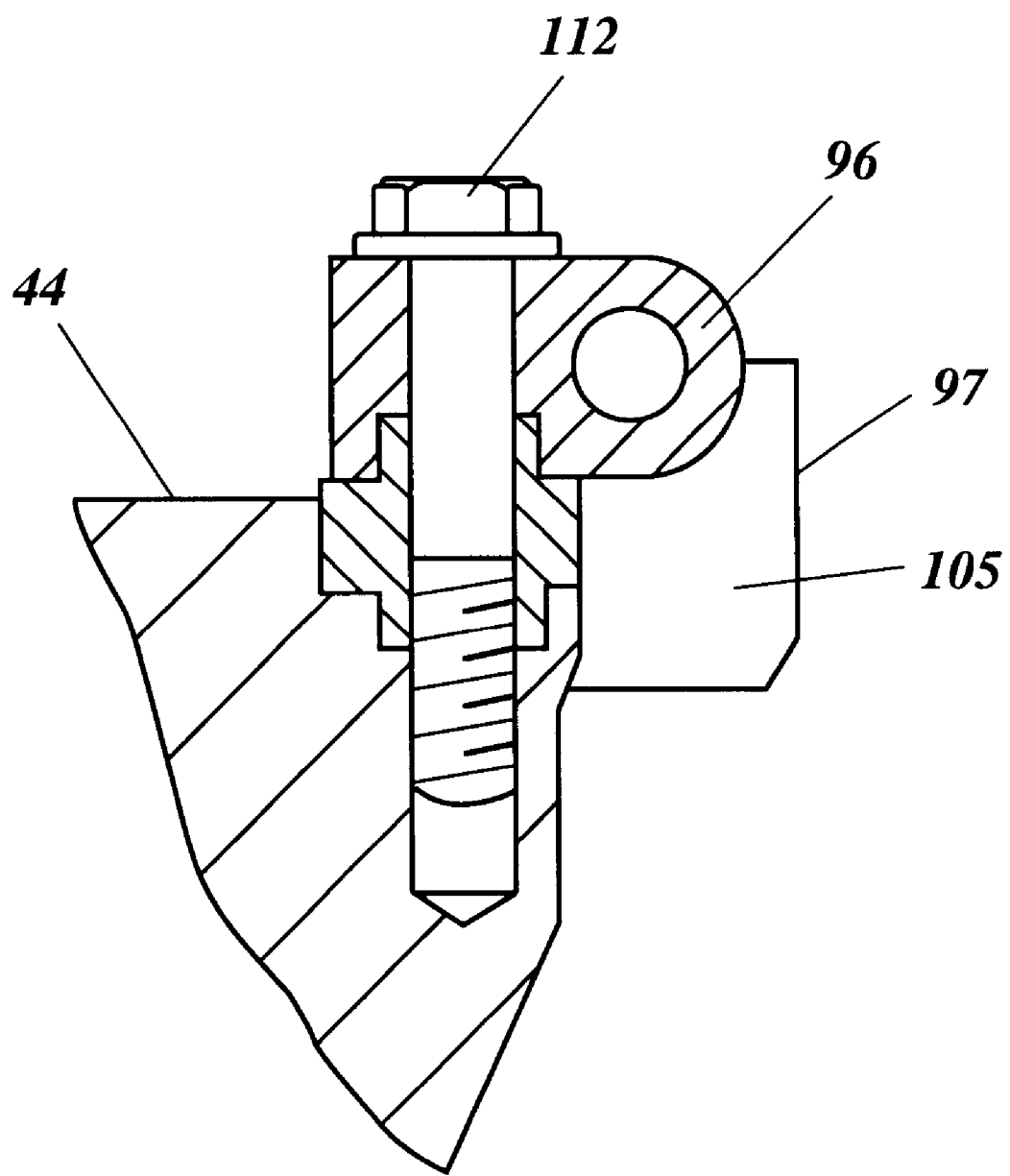
FIG. 4 is a sectioned view of the cylinder head taken along line IV—IV of FIG. 3.
Figure 5:
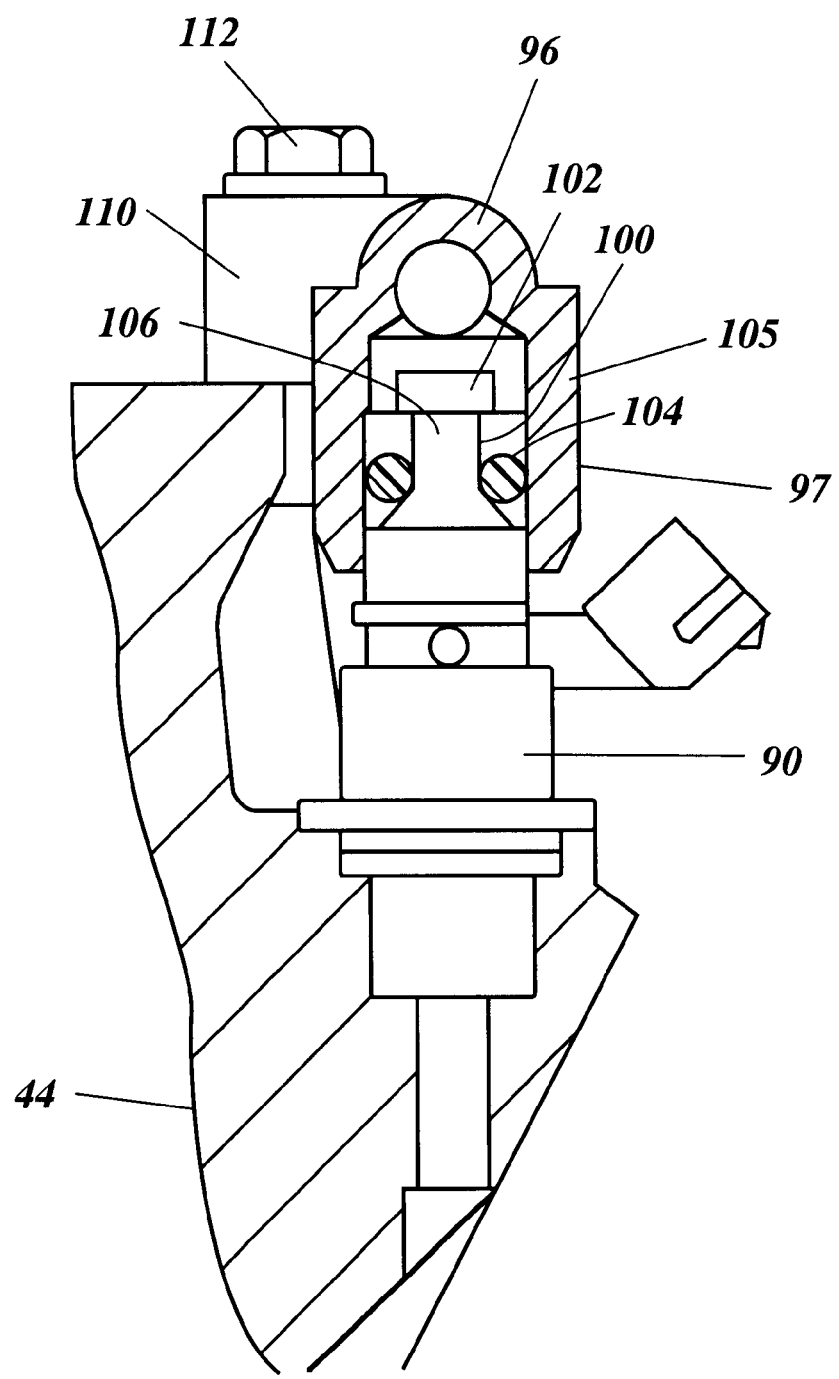
FIG. 5 is a sectioned view of the cylinder head taken along line V—V of FIG. 3.

With additional reference to FIGS. 3–5, the intake port 62 and/or intake runner 64 can incorporate a conduit separator 65 thereby bifurcating the intake runner 64 and/or intake port 62, as previously described. Preferably, the conduit separator 65 is located within the intake runner 64, thus allowing a single intake runner 64 to incorporate dual air outlets, and thus deliver intake air to a pair of intake passages 62 formed within the cylinder head assembly 44. The intake manifold 74 is preferably connected to the cylinder head assembly 44, such as by bolts. Accordingly, the intake manifold 74 terminates in a mounting seat 99 and has one or more bolt holes 101 formed therein for attachment to the cylinder head assembly 44.

The cylinder head assembly 44 preferably has additional bolt holes 101 for accommodating mounting bolts 103 to connect the fuel rail 97 with concomitant fuel delivery pipe 96 to the cylinder head assembly 44. The fuel rail 97 includes a plurality of bosses 105, preferably one for each fuel injector 90. The fuel injectors 90 are mounted to the bosses 105 in any suitable manner and are in communication with the fuel delivery pipe 96.

With particular reference to FIG. 5, a fuel delivery side 100 of the fuel injector 90 is positioned within a fuel injector inlet recess 102. Preferably, an o-ring 104 is disposed between the delivery side of the fuel injector and the fuel injector inlet 106 to provide an enhanced seal between the fuel injector 90 and the fuel delivery pipe 96.

A fuel injector nozzle (not shown) is advantageously positioned within a cylinder head assembly 44 allowing proper positioning of the fuel injector 90 with reference to the combustion chamber 46. The orientation of the fuel injector 90 with reference to the combustion chamber 46 improves control of the fuel injection in delivering a desired air/fuel mixture.

For example, but without limitation, when the throttle valve 78 is suddenly opened, such as when pulling a water skier from the water, induction air is quickly accelerated and initially generates a lean mixture in the combustion chamber 46. Such a lean mixture can lead to unwanted misfiring of the engine 32. The position of the fuel injector 90 provides atomization of the air/fuel mixture directly in the combustion chamber, allowing a fast reacting fuel enrichment during sudden acceleration. The fast acting fuel enrichment provides a richer mixture which reduces misfiring and thus provides smoother acceleration.

In one embodiment, a bracket assembly 110 advantageously holds the fuel injector 90 in its mounted position between the intake manifold 74 and the cylinder head assembly 44. The bracket assembly 110 includes a bolt or fastener 112 to securely position the fuel injector 90 such that the fuel injector 90 is unable to rotate. In the illustrated embodiment, the fuel injector 90 is mounted such that its longitudinal axis is approximately parallel to the longitudinal axis of the intake port 62. The fuel injector 90 can include a spray nozzle (not shown) which can be oriented independently of the fuel injector 90 longitudinal axis. However, it is preferable that the fuel spray from the spray nozzle is directed toward the piston 42 within the cylinder bore 40, as best illustrated in FIG. 1.

As shown in FIGS. 1 and 3, the fuel injector 90 is disposed substantially between the intake ports 62 and a plane defined by the junction of the cylinder head assembly 44 and the cylinder block 38. As such, the fuel injector 90 is compactly arranged within the cavity 79 formed between the engine body 38 and the air induction system 60. Moreover, it is preferable to dispose the fuel injector 90 substantially between dual intake passages 62. This results in a very compact arrangement of the fuel delivery system thus allowing for the outboard motor 30 to be more compact. Additionally, by more efficiently orienting and positioning the fuel delivery components, there is an increased space 79 to allow for other components.

As illustrated in FIGS. 1 and 2, the portion of the induction system 60 defined by the intake manifold 74 extends away from the cylinder head assembly 44. The intake runners 64 extend from the outer end of the intake manifold 74 and curve forwardly, thus leaving an auxiliary space 79 between the induction system 60 and the engine body 38. Thus, the auxiliary space 79 can be used for mounting other components, for example, but without limitation, the fuel pump, vapor separator assembly, throttle link mechanism, battery, starter motor, oil filter, fuel cooler, fuel pressurizer, pressure regulator, or other desired accessories. Moreover, because the space is used more efficiently than in prior art engines, the accessories are able to be added to the engine without substantially impacting the overall size of the outboard motor.

The extent to which the portion of the intake passage extends away from the cylinder head assembly 44 affects the lateral dimension of the auxiliary space 79. Thus, by shaping the intake runner 64 and the intake manifold 74 to extend around the fuel injector 90, the auxiliary space 79 is enlarged sufficiently to accommodate additional components, thus allowing a compact arrangement within the auxiliary space 79. Additionally, because the intake runners 64 extend around two sides of the fuel injector 90, the heating effect of the engine body 56 on the fuel injectors 90 is at least partially compensated for by the cooling effect of the intake runner 64.

Figure 6:
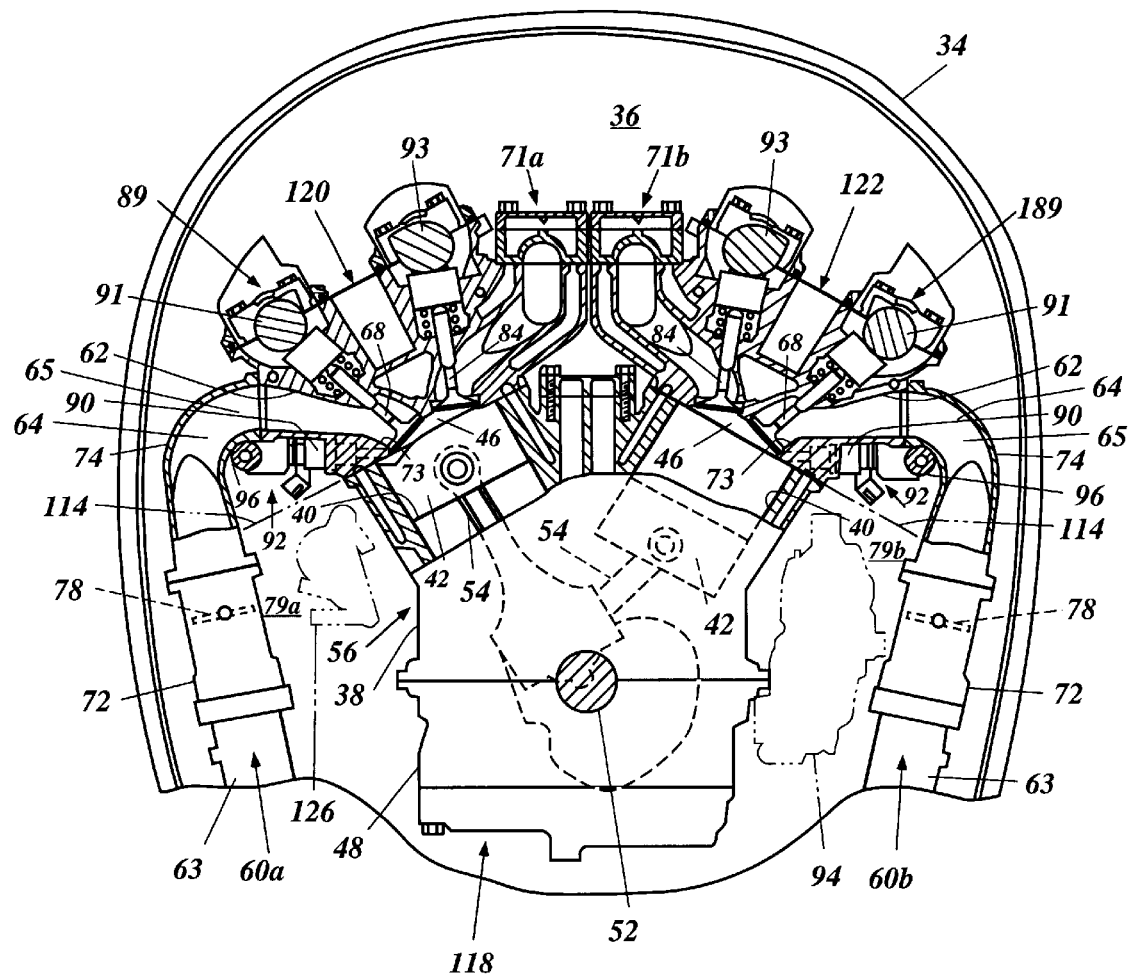
FIG. 6 is a partial top plan view of an outboard motor configured in accordance with another preferred embodiment of the present invention, with a portion of an engine of the outboard motor shown in section.

With reference to FIG. 6, an alternative embodiment of the four cycle engine 118 of the present invention is illustrated. In this illustrated embodiment, a plurality of cylinders are arranged in a V-shape configuration. A cylinder body 38 defines a plurality of cylinder bores 40. Each cylinder bore 40 has a reciprocating piston 42 slidably disposed therein, which is coupled to a crankshaft 52 by connecting rods 54 as known in the art. A first cylinder bank 120 and second cylinder bank 122 each may comprise one, two, three or more cylinders and are angularly spaced from one another about the crankshaft. In the illustrated embodiment, the number and orientation of the cylinders results in a V-6 four-stroke engine. The engine operates in accordance with the principles discussed in relation to the inline four cylinder engine discussed above, and therefore, the above description of the engine and its systems applies equally to this embodiment and, consequently, common reference numerals are used to describe the V-6 engine of FIG. 6.

One notable difference of the embodiments utilizing a V-6 engine is the necessity of dual induction systems 60a, 60b and dual exhaust systems 71a, 71b to service the twin cylinder banks 120, 122. The aforementioned advantageous location and orientation of the fuel injectors 90 in combination with the spatial orientation of the induction systems 60a, 60b provides equally advantageous benefits when used in the context of an engine having a V-shape cylinder bank configuration.

Specifically, each induction system 60a, 60b is spaced away from the engine body 56, which results in an auxiliary space 79a, 79b therebetween. In accordance with one aspect of the present invention, the induction systems 60a, 60b begin with a plenum chamber 66, which exits to a plurality of intake pipes 63. The intake pipes 63 are coupled to throttle bodies 72, which house a plurality of throttle valves 78, as is known in the art. The throttle bodies 72 lead to an intake manifold 74 and are connected thereto at a manifold flange 75. The intake manifold 74, as described, defines a number of intake runners 64 which are each bifurcated by a conduit separator 65 thereby providing a pair of outlets associated with each intake runner 64. Accordingly, the cylinder head assembly 44 defines a pair of intake passages 62 that communicate with each pair of intake runner 64 outlets.

As discussed above, the intake passages 62 are in selective communication with the associated combustion chamber 46 by intake valves 68. Additionally, a fuel injector 90 is in communication with each combustion chamber 46. It is the cooperation of the induction system 60 and the fuel injection system 92 that provides the necessary air/fuel charge to the combustion chamber 46.

It is desirable for the air induction system 60 to be configured with a low flow resistance to allow a greater volume of air to flow therethrough and to the combustion chamber 46. A greater volume of air and fuel into the combustion chamber results in a more violent combustion process, and hence, increases engine output.

Accordingly, the induction system 60 is preferably spaced away from the engine body 56 and generally follows the cowling 34. This spacing of the induction system 60 from the engine body has the additional advantage of reducing heat transfer from the engine body 56 through the induction system 60 and to the intake air.

Preferably, the induction system 60 extends generally linearly from the plenum chamber 66 to a location that is beyond an imaginary line 114 extending laterally from the connection between the cylinder body 38 and the cylinder head assembly 44. The induction system 60 then curves and extends toward the cylinder head assembly 44 and mates therewith. Preferably, the curvature of the induction system is smooth and has a fairly large radius to minimize any efficiency losses due to the increase in friction caused by the curvature of the induction system 60.

Portions of the fuel delivery system 92 are disposed generally adjacent to the induction system, and more specifically, adjacent to the intake manifold 74. More preferably, the fuel rail 97, fuel delivery pipe 96, and fuel injectors 90 are disposed between the imaginary line 114 and the intake manifold 74.

By arranging the fuel delivery system 92 components in a compact position, a greater auxiliary space 79*a*, 79*b* is provided to house additional auxiliary components, such as a vapor fuel separator 94, a throttle link mechanism 126, an oil filter (not shown), a fuel cooler (not shown), a fuel pressurizer (not shown), a pressure regulator (not shown) and other additional components. In at least one embodiment, the fuel vapor separator 94 is able to have an increased volume, thereby operating more efficiently to beneficially affect the engine performance. Additionally or alternatively, another auxiliary component, such as a throttle linkage 126, may be placed in one or both of the auxiliary spaces 79*a*, 79*b*, which advantageously keeps the linkage components short, thereby reducing any slop in the mechanism that is often introduced when the linkages must travel long distances to actuate the respective components.

Moreover, by compacting the fuel delivery system 92 components adjacent to the induction system 60 components, the intake air indirectly cools the fuel through conduction between the fuel, fuel delivery system 92 components, induction system 60 components, and the intake air. The cooled fuel allows the engine to operate more efficiently by providing a more dense air/fuel charge.

Finally, by creating and utilizing the increased auxiliary space 79*a*, 79*b*, the auxiliary components can be fitted close to the engine body 56 which allows for a compact engine arrangement.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A four-cycle engine for use in an outboard motor comprising a cylinder body defining at least one cylinder bore therethrough, a cylinder head assembly connected to the cylinder body, a piston disposed within the cylinder bore, the cylinder body, the cylinder head assembly, and the piston cooperating to define a combustion chamber, at least one intake passage formed in the cylinder head assembly, a crankshaft rotatably coupled to the piston, a fuel injector having a longitudinal axis and arranged to directly inject fuel into the combustion chamber, the fuel injector disposed between the intake passage and an imaginary line extending laterally from a junction between the cylinder body and the cylinder head assembly when viewed from a direction along an axis of the crankshaft, the axis of the fuel injector arranged to be substantially parallel to the intake passage defined by the cylinder head assembly, an induction system being connected to the intake passage and extending generally laterally from the cylinder head assembly and then along a side of the cylinder body at a distance from the cylinder body, and an auxiliary component disposed in a space formed between the induction system and the cylinder body.

2. The four-cycle engine of claim 1, wherein the cylinder head assembly includes at least two intake passages that are disposed next to each other in a direction that extends generally parallel to the axis of the crankshaft, and the fuel injector is disposed in a vicinity between the two intake passages.

3. The four-cycle engine of claim 1, wherein the auxiliary component comprises a fuel vapor separator.

4. The four-cycle engine of claim 1, wherein the auxiliary component comprises a throttle link mechanism.

5. The four-cycle engine of claim 1, wherein the auxiliary component comprises a battery.

6. The four-cycle engine of claim 1, wherein the auxiliary component comprises a starter motor.

7. The four-cycle engine of claim 1, wherein the auxiliary component comprises an oil filter.

8. The four-cycle engine of claim 1, wherein the auxiliary component comprises a fuel cooler.

9. The four-cycle engine of claim 1, wherein the cylinder body defines a plurality of cylinder bores arranged in a V-shape, and wherein the induction system is disposed on the exterior of the V-shape.

10. The four-cycle engine of claim 1 additionally comprising a fuel rail configured to deliver fuel to the fuel injector, the fuel rail being mounted to the cylinder head assembly.

11. The four-cycle engine of claim 10, the fuel rail being mounted to the cylinder head with at least one fastener.

12. The four-cycle engine of claim 10 wherein the fuel rail comprises a conduit portion extending generally parallel to the crankshaft and a boss portion connecting an inlet end of the fuel injector with the conduit portion of the fuel rail.

13. The four-cycle engine of claim 12, wherein the fuel rail includes a mounting flange extending from the conduit portion and spaced from the boss portion.

14. The four-cycle engine of claim 13, wherein the boss portion extends to a position closer to an outlet end of the fuel injector thaw the mounting flange.

15. The four-cycle engine of claim 13, wherein the boss portion extends to a position closer to an outlet end of the fuel injector than the mounting flange.

16. The four-cycle engine of claim 12, wherein the fuel rail includes a mounting flange extending from the conduit portion and spaced from the boss portion.

17. The four-cycle engine of claim 10, the fuel rail being mounted to the cylinder head with at least one fastener.

18. The four-cycle engine of claim 10, wherein the fuel rail comprises a conduit portion extending generally parallel to the crankshaft and a boss portion connecting an inlet end of the fuel injector with the conduit portion of the fuel rail.

19. A four-cycle engine comprising an engine block defining a cylinder bore, a cylinder head assembly attached to the cylinder block to close one end of the cylinder bore, the cylinder head assembly including at least one intake passage, a piston positioned within the cylinder bore and arranged to reciprocate along a cylinder axis so as to define a variable volume combustion chamber together with the cylinder bore and the cylinder head, the intake passage of the cylinder head communicating with the combustion chamber through at least one intake port, a fuel injector configured to inject fuel directly into the combustion chamber and disposed between the engine body and the intake passage, the fuel injector having a longitudinal axis that is oblique to the cylinder axis, and a fuel rail configured to deliver fuel to an inlet end of the fuel injector, the fuel rail including a fuel passage portion extending generally transverse to the cylinder axis and the longitudinal axis of the fuel injector, the fuel rail including a mounting flange extending from the conduit portion, the fuel rail being mounted to the cylinder head with the mounting flange.

20. The engine as in claim 19, wherein the fuel injector is positioned between the intake passage and a plane extending laterally from a junction of the engine body and the cylinder head assembly.

21. The engine as in claim 19, wherein the fuel injector longitudinal axis is generally parallel to a flow axis of the intake passage.

22. The four-cycle engine of claim 19 additionally comprising a fuel rail configured to deliver fuel to the fuel injector, the fuel rail being mounted to the cylinder head assembly.

23. An engine having an engine body comprising at least one variable volume combustion chamber defined in part by a head of a moveable piston, at least one intake port opening into the combustion chamber, an induction system communicating with the intake port through at least one intake passage formed in a cylinder head of the engine body, an intake valve being moveable to regulate communication between the induction system and the combustion chamber through the intake port and the intake passage, a fuel delivery system having at least one fuel injector arranged to lie generally parallel to the intake passage for injecting fuel into the combustion chamber, the fuel injector being positioned between the engine body and the intake passage, and a fuel rail configured to deliver fuel to an inlet end of the fuel injector, the fuel rail including a fuel passage portion extending generally transverse to the cylinder axis and the longitudinal axis of the fuel injector, the fuel rail including a mounting flange extending from the conduit portion, the fuel rail being mounted to the cylinder head with the mounting flange.

24. The engine as set forth in claim 23, wherein the fuel injector is oriented such that the fuel injector injects fuel into the combustion chamber toward the head of the piston.

25. The engine as set forth in claim 23, wherein the engine body comprises a crankcase, a cylinder block, and a cylinder head assembly, the induction system extends away from the cylinder head assembly, along a side of the cylinder block, toward the crankcase.

26. An outboard motor comprising an engine including an engine body, the engine body cooperating with at least one reciprocating piston to define at least one combustion chamber, an induction system configured to guide air to the combustion chamber through at least a pair of intake ports, at least one fuel injector configured to inject fuel for combustion in the combustion chamber, the fuel injector being mounted between the engine body and at least a portion of the induction system and generally in between the pair of intake ports, the fuel injector configured to spray fuel toward the piston, and a fuel rail configured to deliver fuel to an inlet end of the fuel injector, the fuel rail including a fuel passage portion extending generally transverse to the cylinder axis and the longitudinal axis of the fuel injector, the fuel rail including a mounting flange extending from the conduit portion, the fuel rail being mounted to the cylinder head with the mounting flange.

27. The outboard motor of claim 26, wherein the engine body comprises a cylinder body connected to a cylinder head, and wherein the fuel injector is located between the induction system and a plane extending laterally from the connection between the cylinder body and the cylinder head.

* * * * *